United States Patent [19]

Sudo et al.

[11] Patent Number: 5,765,980
[45] Date of Patent: Jun. 16, 1998

[54] LOOSENING PREVENTIVE SCREW

[75] Inventors: Katsunori Sudo, Wako; Yukichi Iwata, Tokyo, both of Japan

[73] Assignees: Honda Giken Kogyo Kabushiki Kaisha; Iwata Bolt Co., Ltd., both of Tokyo, Japan

[21] Appl. No.: 822,638

[22] Filed: Mar. 21, 1997

[30] Foreign Application Priority Data

Mar. 29, 1996 [JP] Japan .................. 8-077406

[51] Int. Cl.$^6$ .......................... F16B 23/00; F16B 35/06
[52] U.S. Cl. ........................ 411/404; 411/911; 411/919
[58] Field of Search ........................... 411/402, 403, 411/404, 911, 919, 407

[56] References Cited

U.S. PATENT DOCUMENTS

| 4,202,244 | 5/1980 | Gutshall | 411/404 |
|---|---|---|---|
| 5,171,117 | 12/1992 | Seidl | 411/404 |
| 5,291,811 | 3/1994 | Goss | 411/404 X |
| 5,647,712 | 7/1997 | Demirdogen et al. | 411/911 X |

FOREIGN PATENT DOCUMENTS

| 5-65724 | 7/1986 | Japan . | |
|---|---|---|---|
| 2149872 | 6/1985 | United Kingdom | 411/911 |

*Primary Examiner*—Neill R. Wilson
*Attorney, Agent, or Firm*—Merchant, Gould, Smith, Edell, Welter & Schmidt, P.A.

[57] ABSTRACT

A cross-recessed head screw has in its head a tool engagement recess including first releasing surfaces which are adapted to be engaged with generally flat front edges of an end of a cross-headed tip screwdriver and have the function of moving the screwdriver backward when the screwdriver is turned in the reverse direction for loosening the screw. The tool engagement recess further has second releasing surfaces each contiguous to a corresponding one of the first releasing surfaces and serve to guide the backward movement of the screwdriver as the latter is turned in the screw-loosening reverse direction. By virtue of engagement between the first releasing surfaces and the front edges of the screwdriver, the reverse rotation of the screwdriver produces only a small friction torque which is quite insufficient to cause rotation of the screw in the screw-loosening direction. The first releasing surfaces project from the second releasing surfaces toward the axis of the tool engagement recess, so that when a screwdriver one size smaller than the specified screwdriver is inserted into the tool engagement recess, a tip end of the one-size-smaller screwdriver comes into abutment with only a small area extending in the vicinity of inner edges of the respective first releasing surface. With this small contact area provided between the tool tip and the first releasing surfaces, the screwdriver is likely to slip or turn freely when it is rotated in the reverse direction.

8 Claims, 10 Drawing Sheets

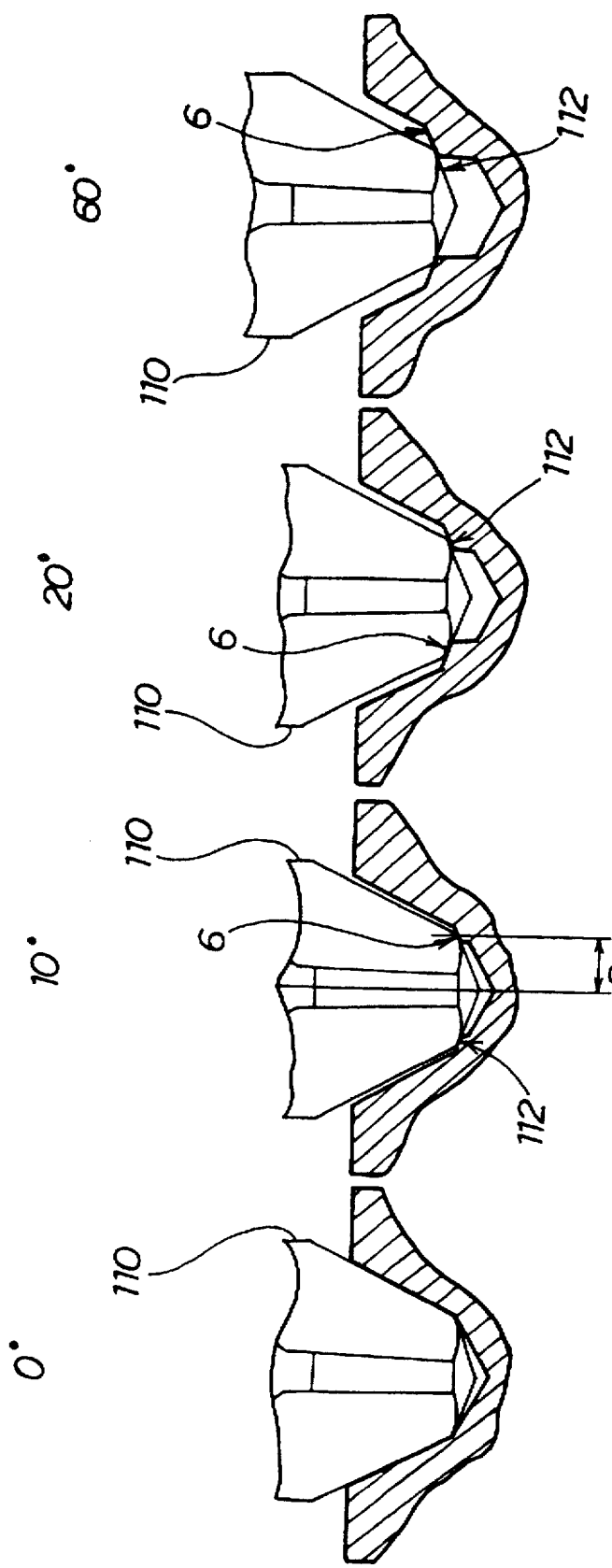

1

LOOSENING PREVENTIVE SCREW

BACKGROUND OF THE INVENTION

1. Field of the Invention

The present invention relates generally to a screw having in its head a recess in the shape of a cross or a hexagon, and more particularly to an improvement in a cross-recessed head screw or a polygonal-socket head screw which does not allow loosening thereof once it is tightened. The term "screw" used herein should be construed as including bolts.

2. Description of the Related Art

Generally, a cross-recessed head screw is tightened or loosened by a "plus" screwdriver (formally a cross-headed tip screwdriver) or a nut runner having such a plus screwdriver at a top end thereof. Similarly, a hexagon socket head screw is tightened or loosened by means of a hexagonal wrench (formally a hexagonal wrench key). For the screws primarily intended for use in an area or place to which free access is limited due to an adjustment or setting already performed or a possible danger, it is desirable that an appropriate measure shall be taken to make the screws preventive against loosening thereof by regular or usual tools.

To meet this desire, various loosening preventive screws have been proposed. One such proposed loosening preventive screw has in its head a cross recess designed such that a rotational force or torque applied from a regular screwdriver acts effectively on the head of the screw only when the screwdriver is turned in the screw-tightening direction. Turning the screwdriver in the screw-loosening direction creates no effective transmission of torque to the screw head. The screw can be loosened only when a specially designed screwdriver is used.

Japanese Patent Publication No. HEI 5-65724, for example, discloses a loosening preventive cross-recessed head screw. The disclosed screw, as shown in FIG. 1 of the same Publication, has a cross recess including four radial grooves each having, on its one side adapted to be forced by a plus screwdriver being turned in the screw-loosening direction, two contiguous walls sloping upwardly at respective angles from the bottom of the cross recess to an intermediate portion of each radial groove, a first releasing surface contiguous to respective upper ends of the two walls and sloping such that the degree or depth of engagement between the cross recess and the screwdriver decreases gradually toward an open end of the cross recess and along the screw-loosening direction, and a second releasing surface contiguous to the first releasing surface and sloping at a greater angle than the first releasing surface. As illustrated in FIG. 3 of the above-mentioned Publication, when the plus screwdriver is turned in the screw-loosening direction with its cross-headed tip received in the cross recess of the screw, the tip goes up on the first releasing surfaces via the two walls. In this instance, since the first releasing surface has an upward slope, the screwdriver goes back away from the bottom of the cross recess and finally separates from the cross recess in the head of the screw. Thus, the known cross-recessed head screw cannot be loosened by the regular screwdriver.

A tool engagement recess (cross recess) substantially the same in configuration as the cross recess of the above-mentioned Publication will be described below in greater detail with reference to FIG. 11.

In FIG. 11 the tool engagement recess 100 includes a central recess 102, four engagement grooves 101 extending radially outwardly from the central recess 102 in such a manner as to form a cross, four abutment surfaces 103 each forming one vertical wall of the respective engagement groove 101 and adapted to be forced by a tool, such as a screwdriver, when the tool is turned in a direction for tightening the screw, and four releasing surfaces 104 each disposed between two adjacent ones of the engagement grooves 101 and sloping upwardly from the point a to the point b in a direction substantially the same as the screw-loosening direction.

FIGS. 12A and 12B are operational views showing the relationship between the tool engagement recess 100 shown in FIG. 11 and a tool or a screwdriver 110.

As shown in FIG. 12A, the screwdriver 110 is turned in the screw-tightening direction indicated by the arrow (a) whereupon four blades 111 of the screwdriver 110 force the mating abutment surfaces 103 of the tool engagement recess 100 in a direction to turn the screw in the clockwise direction.

When the screwdriver 110 is turned in the counterclockwise direction (screw-loosening direction), the blades 111 slide along the respective releasing surfaces 104 as indicated by the arrow (b) shown in FIG. 12B. With this sliding movement of the blades 111, the blades 111 are gradually lifted from the back to the front of the drawing sheet of FIG. 12B and finally displaced to the outside of the tool engagement recess 100.

FIG. 13 is a cross-sectional view of the tool engagement recess 100 shown with a tip of the tool 110 received therein for the purpose of describing the operation of the recess 100, the view corresponding to FIG. 6 of Japanese Patent Publication No. HEI 5-65724.

Each of the blades 111 of the tool or screwdriver 110 has a bottom edge 112 slightly inclined from a horizontal plane, and a side edge 113 greatly inclined from the horizontal plane. When the screwdriver 110 is turned in the counterclockwise direction indicated by the arrow, the side edge 113 of each blade 111 moves upwardly along a narrow sloped surface 106 on the shank side of the screw head and then along the releasing surface 107 on the open end side of the screw head, as indicated by the arrow (c). Continuing the counterclockwise rotation of the screwdriver 110 finally disengages the tip of the screwdriver 110 from the tool engagement recess 100.

In FIG. 13, the equation Tr=Rxf holds where R represents the distance from the axis of rotation O to an intermediate portion of the side edge 113, f the reaction force at the intermediate portion of the side edge 113, and Tr the rotational force or torque of the screwdriver 110. The distance R is sufficiently large to produce a large rotational force T. The rotational force Tr is a friction torque which may act as a screw-loosening torque depending on direction of rotation of the screwdriver 110. In the case of an insufficiently tightened screw, the friction torque Tr may sometimes exceed a fastening force of the screw. In that case, the screw readily becomes loose when the screwdriver 110 is turned in the counterclockwise direction.

It was also found that a difficulty arises when a screwdriver one size smaller than the specified screwdriver is used by mistake or confusion in a manner as shown in FIGS. 14A and 14B.

FIG. 14A illustrates a condition in which a tip end of the one-size-smaller screwdriver 110' is inserted in the tool engagement recess 100. In this condition, four blades 111' of the screwdriver 110' are all disposed within a working area of the releasing surfaces 104 and have no portion projecting beyond the peripheries of the releasing surfaces 104.

FIG. 14B is a cross-sectional view taken along the line 14B–14B of FIG. 14A and shows that side edges 113' of the respective blades 111' are held in close or face-to-face contact with the releasing surfaces 104.

In this condition, if the screwdriver 110' is turned in the counterclockwise direction (screw-loosening direction) indicated by the arrow (d) shown in FIG. 14A, the respective side edges 113' of the screwdriver 110' will fictionally force the mating releasing surfaces 104 to move together in the screw-loosening direction, thereby turning the screw in the clockwise direction.

SUMMARY OF THE INVENTION

With the foregoing difficulties in view, an object of the present invention is to provide a screw which is capable of reducing a frictional torque generated when a screwdriver is turned for loosening the screw, and which does not allow loosening thereof even when a screwdriver one size smaller than the specified screwdriver is used.

A cross-recessed head screw of the present invention has a tool engagement recess formed in a head of the screw. The tool engagement recess includes a first releasing surface engageable with a front edge of a tool (screwdriver) to move the tool backward when the tool is turned in the reverse direction (screw-loosening direction), and a second releasing surface contiguous to the first releasing surface and serving to guide the backward movement of tool. The first releasing surface has the function of lifting the (substantially horizontal) front edge of the tool upwardly to disengage the tool from the tool engagement recess when the tool is turned in the reverse direction. By virtue of the first releasing surface, reverse rotation of the tool generates only a small friction torque which is quite insufficient to turn the screw in the reverse direction.

The first releasing surface projects from the second releasing surface toward the axis of a central recess of the tool engagement recess. When a tool (screwdriver) one size smaller than the specified tool (screwdriver) is inserted into the tool engagement recess, the tip end of the tool comes into abutment with only a small area extending in the vicinity of an inner edge of the first releasing surface. With this small contact area between the tool tip and the first releasing surface, the tool is liable to slip or rotate freely when it is rotated in the reverse direction.

A loosening preventive polygonal-socket head screw according to the present invention has in its head a tool engagement recess into which an end of a polygonal wrench key is inserted for turning the screw. The tool engagement recess includes a plurality of releasing surfaces engageable with an end face of the wrench key to force the wrench key in an axial backward direction when the wrench key is turned in the reverse direction (screw-loosening direction). The releasing surfaces are engageable with the end face of the wrench key and lift up the wrench key as it is turned in the reverse direction. By virtue of the releasing surfaces, reverse rotation of the wrench key produces only a small friction torque which is quite insufficient to cause rotation of the screw in the loosening direction.

BRIEF DESCRIPTION OF THE DRAWINGS

The preferred embodiments of the invention will now be described by way of example and with reference to the accompanying drawings, in which:

FIGS. 4A through 4D are diagrammatical explanatory views showing the operation of the loosening preventive, cross-recessed head screw taken in conjunction with the positional relationship between the tool engagement recess of the screw and a screwdriver;

DETAILED DESCRIPTION OF THE PREFERRED EMBODIMENTS

Figure 1:
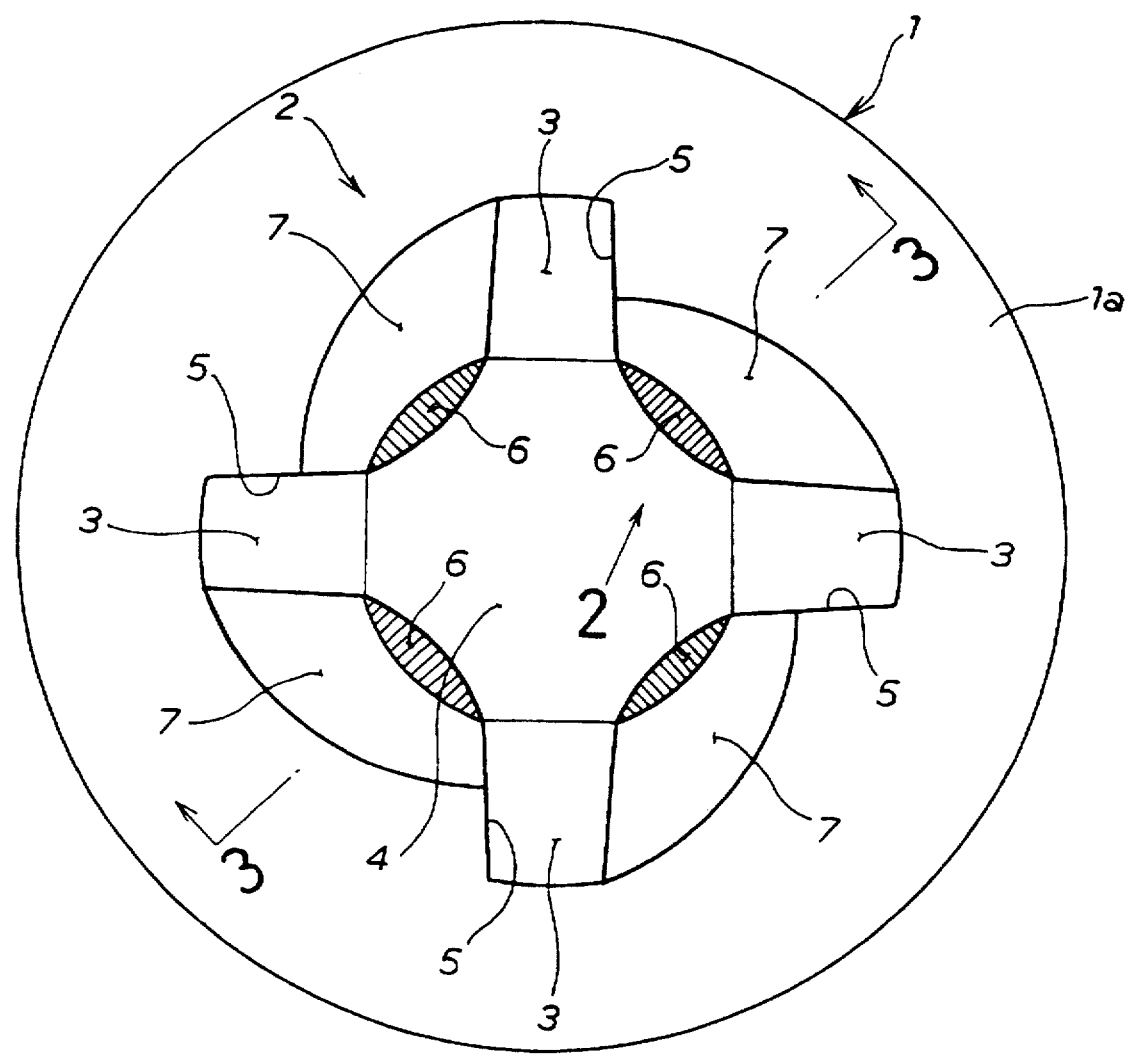
FIG. 1 is a plan view of a head of a loosening preventive, cross-recessed head screw according to a first embodiment of the present invention.

Referring now to the drawing and FIG. 1 in particular, there is shown a loosening preventive cross-recessed head screw 1 according to an embodiment of the present invention. The screw 1 has in its head 1a a tool engagement recess 2 into which an end of a tool, such as a screwdriver, is inserted for turning the screw 1.

The tool engagement recess 2 is in the shape of a cross and includes a central recess 4 located at the center of the head 1a and forming a deepest part of the tool engagement recess 2, four engagement grooves 3 extending radially outwardly from the central recess 4 and circumferentially spaced at equal intervals, a vertical wall-like abutment surface 5 forming a part of each of the engagement grooves 3 and adapted to be forced or thrust by the end of the tool when the tool is turned in one direction for tightening the screw 1, a first releasing surface 6 extending between each adjacent pair of the engagement grooves 3 and located in the vicinity of the bottom of the central recess 4, and a second releasing surface 7 disposed between each adjacent pair of the engagement grooves 3 and sloping upwardly and radially outwardly from the first releasing surface 6.

The four engagement grooves 3 communicate together by the central recess 4 and form jointly with the central recess 4 a cross recess.

The second releasing surfaces 7 have an upward slope or inclination rising gradually toward the direction of counterclockwise rotation of the screw (i.e., screw-loosening direction). In other words, the second releasing surfaces 7 are profiled such that they have a varying radius about the center of the central recess 4 which decreases gradually in the direction of counterclockwise rotation of the screw 1. The second releasing surfaces 7 thus profiled are continuously held in sliding contact with side edges of the end of the screwdriver and stably guide an upward movement (axial backward movement) of the screwdriver when the screwdriver is gradually lifted by the first releasing surfaces 6 as it is turned in the counterclockwise direction (screw-loosening direction).

Figure 2:
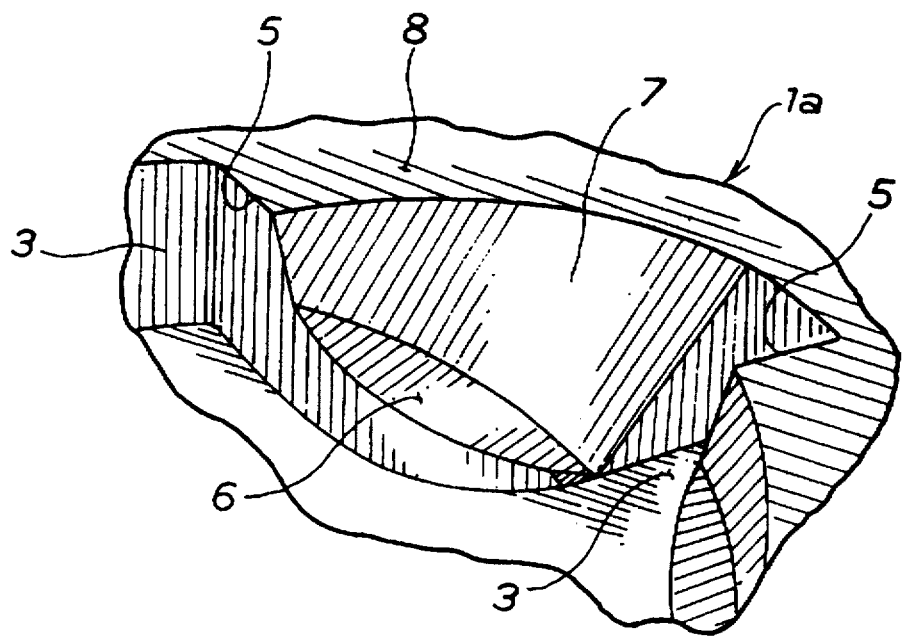
FIG. 2 is a fragmentary perspective view taken in the direction of the arrow 2 of FIG. 1, showing a portion of a tool engagement recess in the head.

FIG. 2 illustrates the positional relationship between one of the engagement grooves 3 and an associated pair of first and second releasing surfaces 6, 7.

The first releasing surface 6 is a terrace-like sloped surface having an upward inclination rising toward the direction of counterclockwise rotation of the screw.

The second releasing surface 7 is a sloped surface having, as previously described, an upward slope or inclination rising toward a radial outward direction and toward the direction of counterclockwise rotation of the screw. The sloped surface (second releasing surface) 7 interconnecting an outer peripheral edge of the first releasing surface 6 and a top surface 8 of the screw head 1a.

Figure 3:
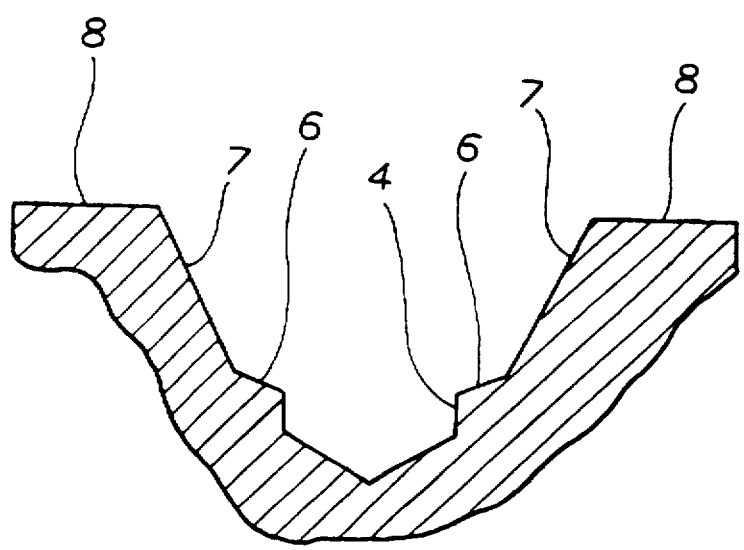
FIG. 3 is a cross-sectional end view taken along the plane 3—3 of FIG. 1.

FIG. 3 shows an axial profile of the tool engagement recess 2 which is formed jointly by the central recess 4, two diametrically opposed ones of the terrace-like first releasing surfaces 6, two second releasing surfaces 7 associated with the first releasing surfaces 6, and the top surface 8 of the screw head 1a. The central recess 4 is located at the center of the screw head 1a. The first releasing surfaces 6 extend contiguously from a peripheral wall of the central recess 4 toward radial upward directions. The second releasing surfaces 7 slope upwardly and outwardly from the respective outer peripheral edges of the first releasing surfaces 6 and merge into the top surface 8 of the screw head 1a.

The first releasing surfaces 6, as shown in detail in FIGS. 2 and 3, are sloped surfaces having an upward slope or inclination rising toward a radial outward direction, and the second releasing surfaces 7 extend contiguously and upwardly from the top of the first releasing surfaces 6.

The loosening preventive cross-recessed head screw 1 of the foregoing construction operates as follows.

FIGS. 4A through 4D are views explanatory of the operation of the loosening preventive cross-recessed head screw 1, and a numerical value given at the top of each drawing figure represents an angle of rotation of a plus screwdriver 110 relative to the screw 1 which is observed when the screwdriver 110 is turned in the screw-loosening direction.

FIG. 4A illustrates the initial condition in which the screw is tightly secured, and the tip end of the plus screwdriver 110 received in the tool engagement recess 2 in the screw has a relative rotational angle of 0 (zero) degree.

FIG. 4B shows the condition observed when the screwdriver 110 completes an angular motion or turn in the screw-loosening direction through an angle of 10 degrees from the position shown in FIG. 4A. In this condition, bottom edges (front edges) of the screwdriver 110 just start going up onto the terrace-like first releasing surfaces 6 of the tool engagement recess 2.

FIG. 4C illustrates the condition appearing when the screwdriver 110 completes an angular motion or turn in the screwloosening direction through an angle of 20 degrees from the position shown in FIG. 4A. In this condition, the bottom edges 112 of the screwdriver 110 are lifted to a certain extent by virtue of the upward inclination of the first releasing surfaces 6 rising gradually toward the screw-loosening direction.

FIG. 4D shows the condition observed when the screwdriver 110 completes an angular motion or turn in the screw-loosening direction through 60 degrees from the position shown in FIG. 4A. In this condition, the tip end of the driver 110 is lifted to the full extent by the first releasing surfaces 6.

Figure 13:
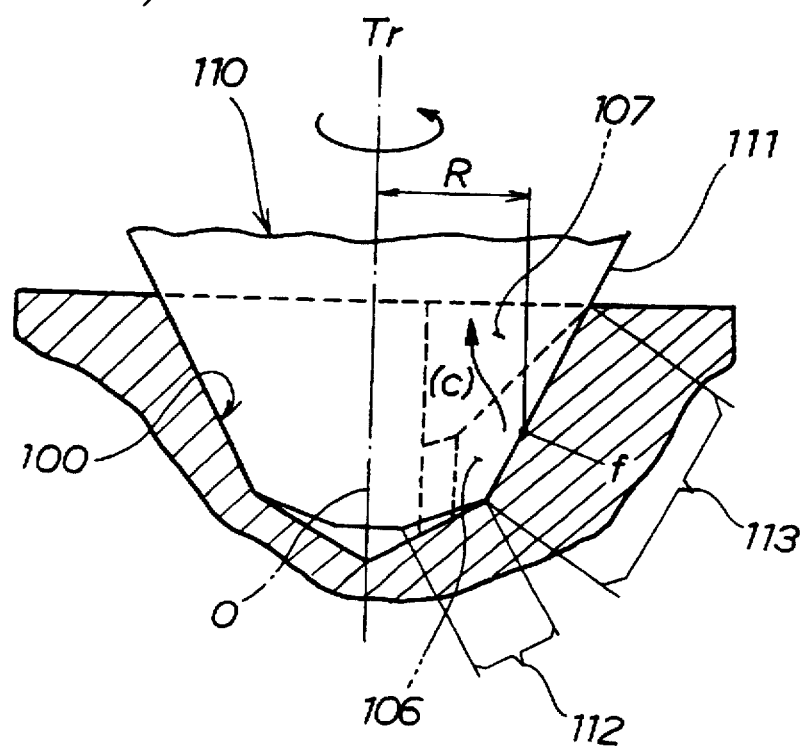
FIG. 13 is a vertical cross-sectional view of FIG. 12A, showing the operation of the tool engagement recess taken in conjunction with the positional relationship between the tool engagement recess and the screwdriver.
Figure 14A:
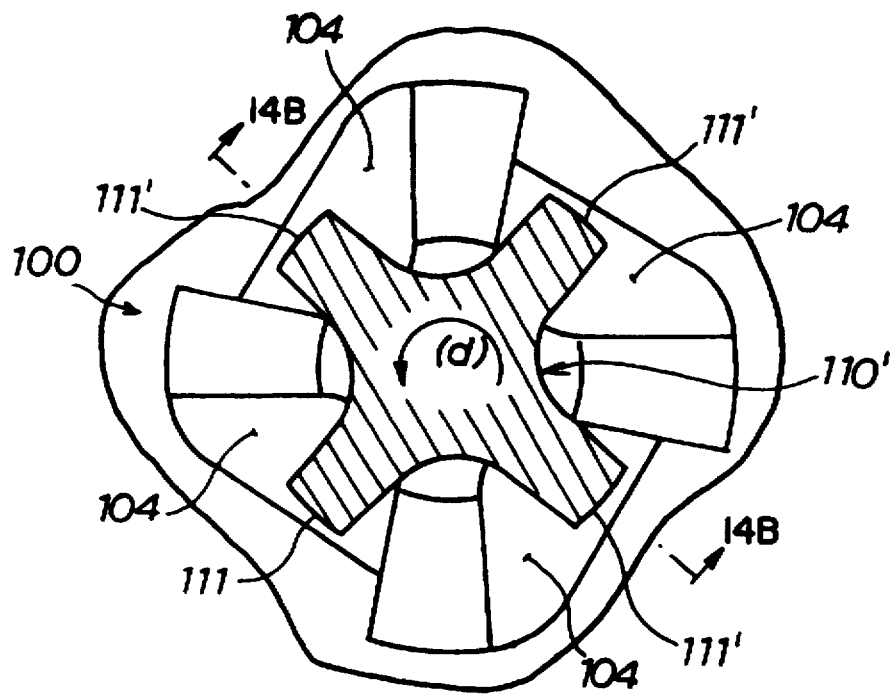
FIGS. 14A and 14B are views explanatory of the operation of the tool engagement recess when it is engaged with a screwdriver which is one size smaller than the screwdriver of FIG. 13.
Figure 14B:
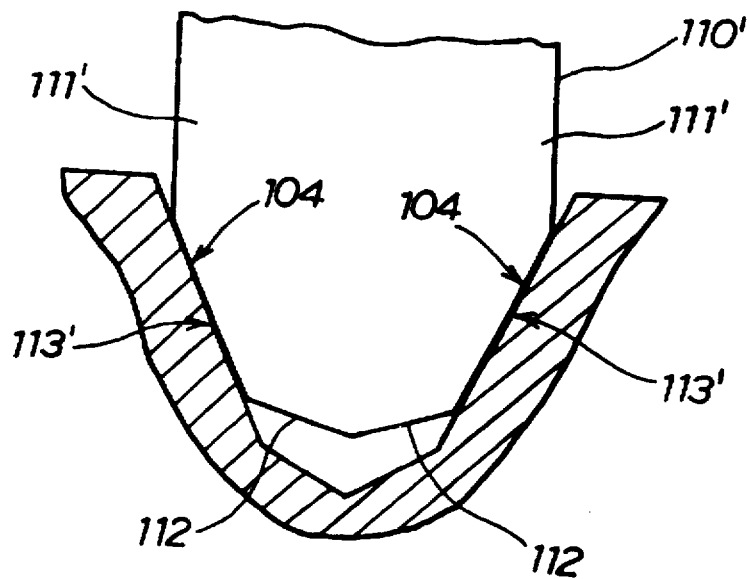

In FIG. 4B the distance from the axis of the screwdriver 110 to the first releasing surface 6 is represented by R2. Since the distance R2 is considerably smaller than the distance R of the prior art shown in FIG. 13, rotation of the screwdriver 110 in the screw-loosening direction creates only a considerably small frictional torque acting on the tool engagement recess. This means that the screw of the foregoing embodiment of the present invention has a higher preventive power or ability against loosening thereof than the screw of the prior art.

Figure 5A:
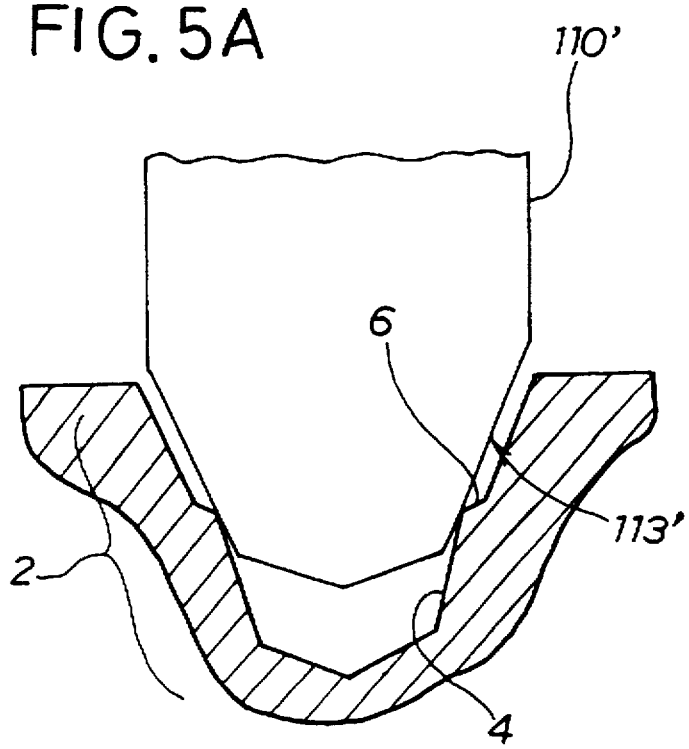
FIGS. 5A and 5B are views showing the relationship between the tool engagement recess and a screwdriver which is one size smaller than a specified screwdriver, for the purpose of comparison between the embodiment of the invention and the prior art.
Figure 5B:
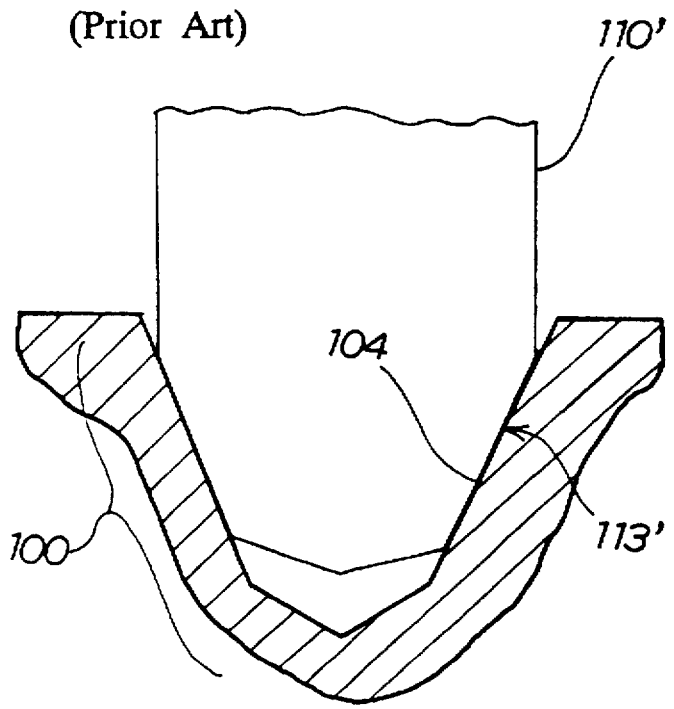

FIGS. 5A and 5B, respectively, show for comparative purposes the screw of the foregoing embodiment of the invention and the screw of the prior art that are used in combination with a screwdriver 110' one size smaller than the specified screwdriver.

As shown in FIG. 5A, the one-size-smaller screwdriver 110' is inserted in the tool engagement recess 2 of the screw of the embodiment of the present invention. In this instance, forward or advancing movement of the screwdriver 110' is arrested or stopped when tapering side edges 113' of the screwdriver 110' come into contact with the upper edges of the respective first releasing surfaces 6. In this condition, the contact area provided between the side edges 113' and the first releasing surfaces 6 is very small, and so rotation of the the screwdriver 110' in the screw-loosening direction does not create such a large friction torque as required for loosening the screw. Rather, the screwdriver 110' while being turned in the screw-loosening direction is allowed to slip on the cross-recess head of the screw.

The one-size-smaller screwdriver 110' shown in FIG. 5B is inserted in the tool engagement recess 100 in the screw of the prior art. In this condition, since the tapering side edges 113' of the screwdriver 110' are held in intimate contact with the releasing surfaces 104 of the tool engagement recess 113', rotation of the screwdriver 110' in the screw-loosening direction creates a large enough friction torque to loose the screw.

It is thus evident from the foregoing comparison that the screw of the present invention is improved in its ability to prevent loosening thereof.

As will be apparent from the following description, the technical idea of the present invention is also useful when embodied in a polygonal-socket head screw, such as a hexagonal-socket head screw.

Figure 6:
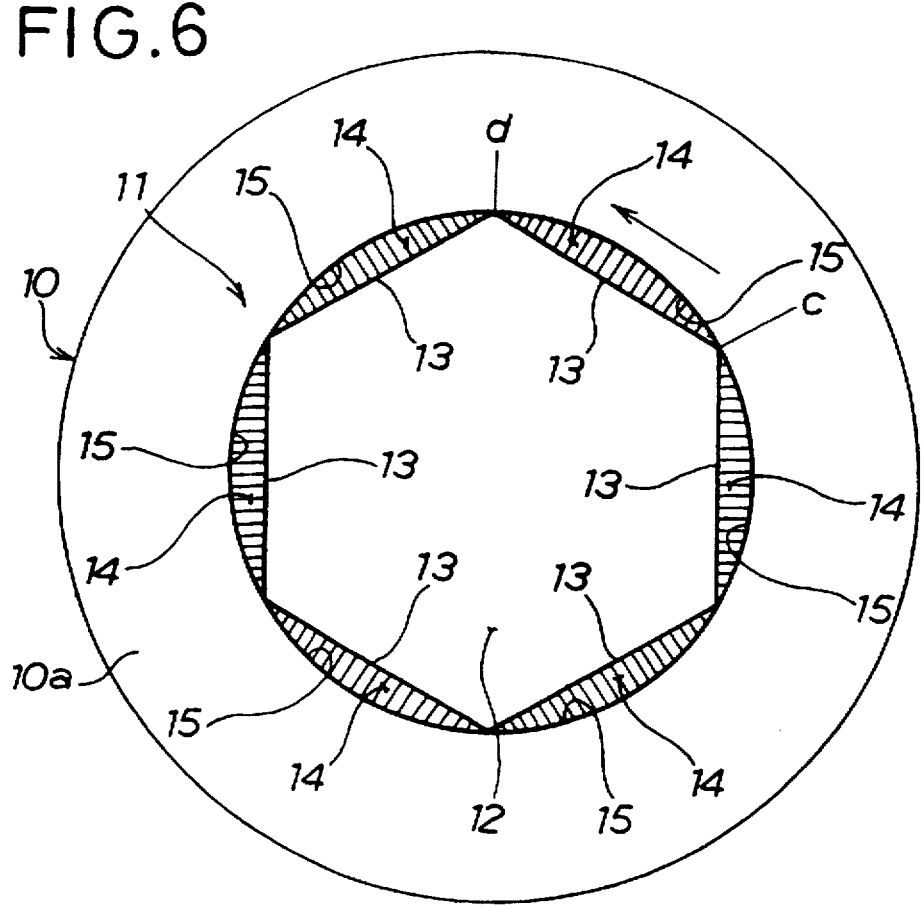
FIG. 6 is a plan view of a head of a loosening preventive, hexagonal-socket head according to a second embodiment of the present invention.

The hexagonal-socket head screw 10 shown in FIG. 6 includes a head 10a having formed therein a tool engagement recess or socket 11 into which an end of a tool such as an L-shaped hexagonal bar or wrench key (allen wrench) is inserted for turning the screw 10.

The tool engagement recess 11 has a central bottom surface 12 located at the center of the head 10a, six axial abutment surfaces 13 extending vertically and upwardly from the periphery of the central bottom surface 12 and so arranged as to form sides of a regular hexagon when viewed from above, six releasing surfaces 14 each extending in a radial outward direction from an upper edge a corresponding to one of the abutment surfaces 13, and six vertical arcuate surfaces 15 each disposed in a radial outward position of a corresponding one of the releasing surfaces 14.

Figure 7:
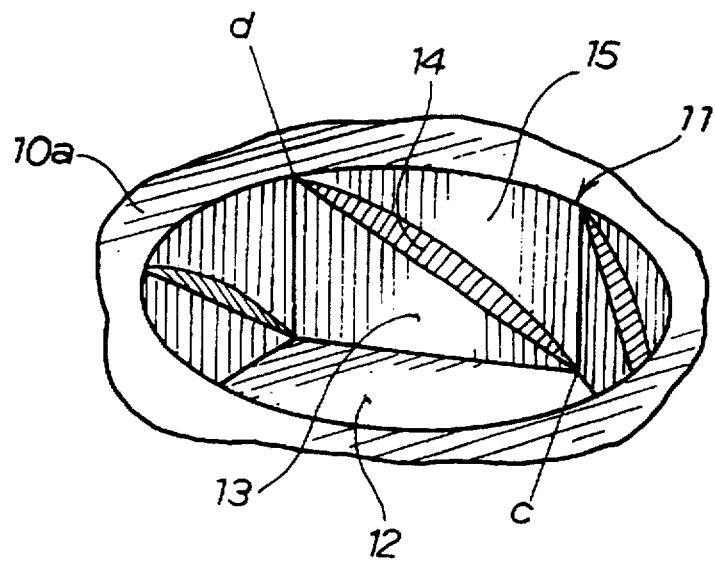
FIG. 7 is a perspective view of a tool engagement recess in the head shown in FIG. 6.

As shown in FIG. 7, each of the vertical abutment surfaces 13 has a right-angled triangular shape, and the releasing surface 14 is formed along the hypotenuse (oblique upper edge) of the right-angled triangular abutment surface 13. The releasing surface 14 has an upward slope or inclination rising in the direction from the point c to the point d which is substantially the same as the screw-loosening direction (direction of counterclockwise rotation of the screw 10 in the illustrated embodiment).

Operation of the hexagonal-socket head screw 10 of the present invention will be described below with reference to FIGS. 8A through 8C.

Figure 8A:
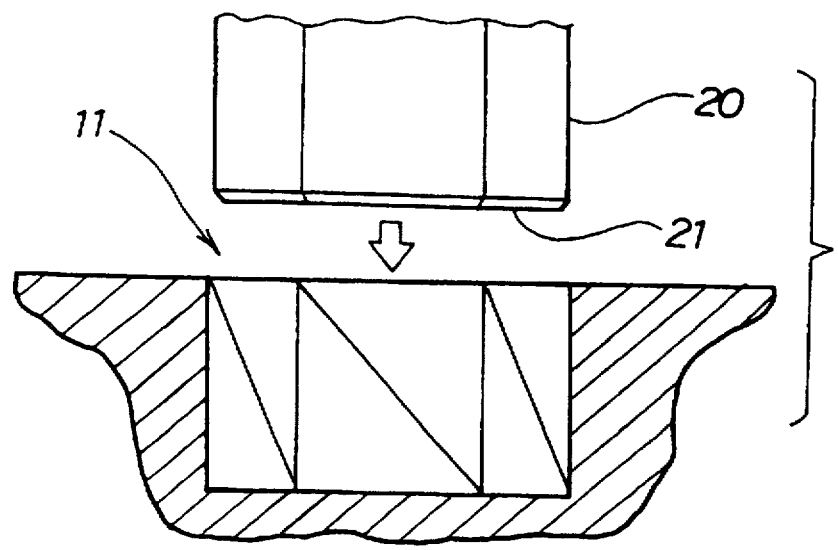
FIGS. 8A to 8C are diagrammatical explanatory views showing the operation of the hexagonal-socket head screw taken in conjunction with the positional relationship between the tool engagement recess in the screw and an allen wrench.

At first, an end of a hexagonal wrench key 20 is inserted into the tool engagement recess 11, as indicated by the voided arrow shown in FIG. 8A.

Figure 8B:
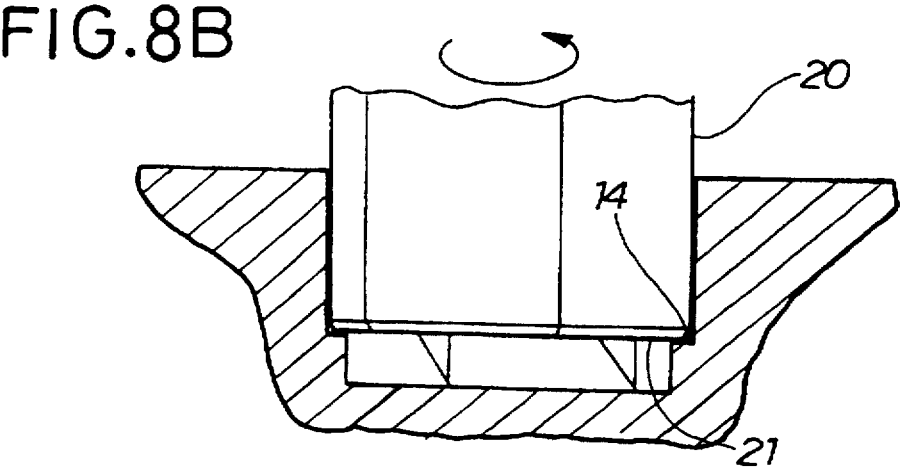

Then the hexagonal wrench key 20 is turned in the counterclockwise direction (screw-loosening direction), as indicated by the arrow shown in FIG. 8B. With this angular movement or turn of the wrench key 20, the bottom face (end face) 21 first goes up on the releasing surfaces 14 and subsequently starts sliding upwardly on the releasing surfaces 14 along the oblique upper edges of the vertical abutment surfaces 13 abutment surfaces 13.

Figure 8C:
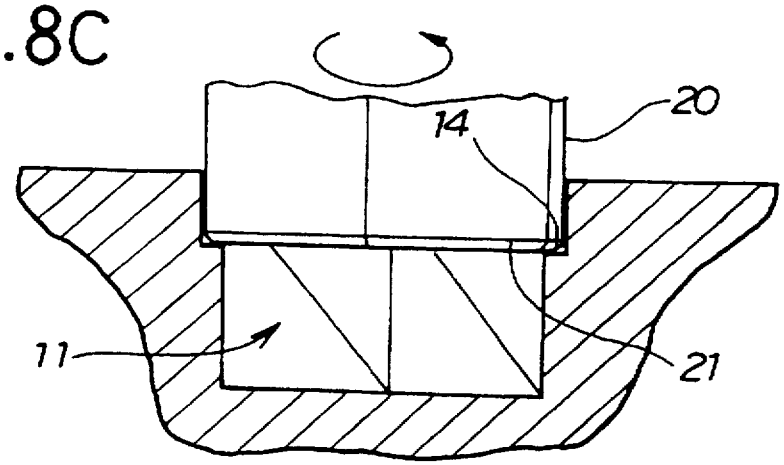

As the wrench key 20 is further turned in the counterclockwise direction, the bottom face 21 of the wrench key 20 further ascends the releasing surfaces, as shown in FIG. 8C. Continuing counterclockwise movement of the wrench key 20 eventually brings about detachment of the wrench key 20 from the tool engagement recess 11.

Thus, the hexagonal-socket head screw 10 of the present invention cannot be loosened by regular tools.

Figure 9:
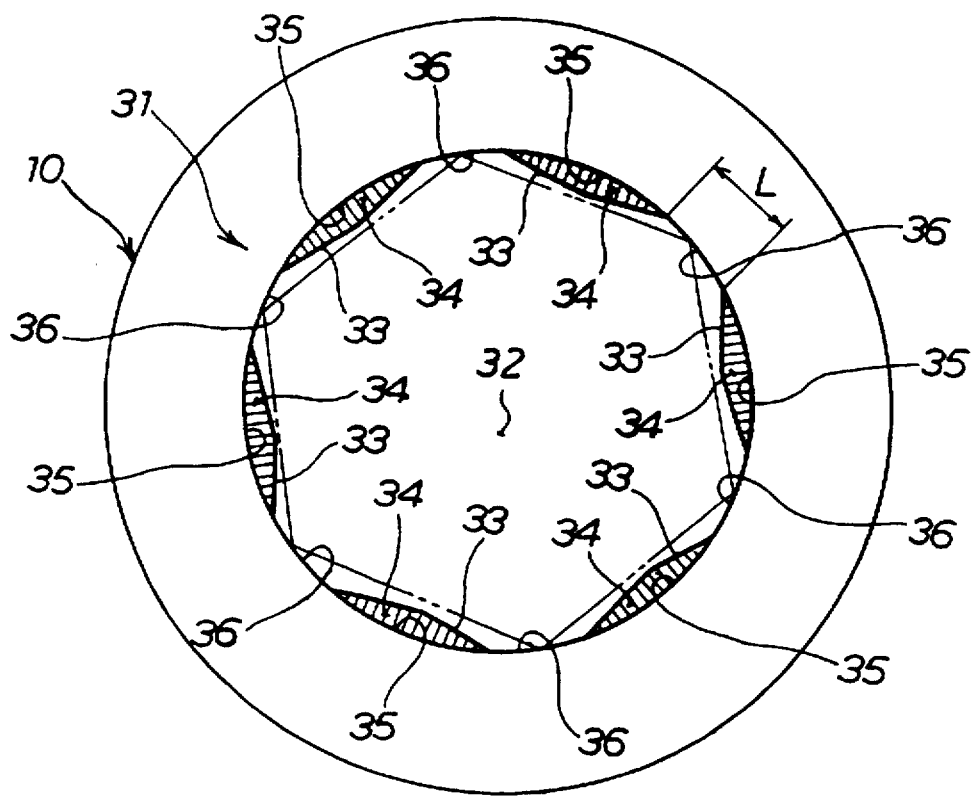
FIG. 9 is a plan view showing another embodiment of the tool engagement recess in the hexagonal-socket head screw of the present invention.
Figure 10:
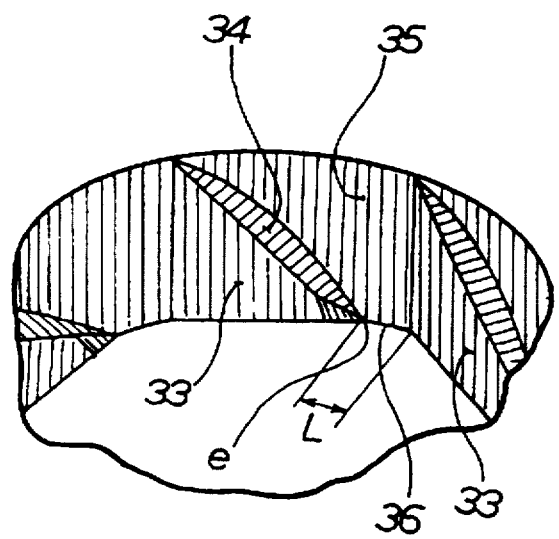
FIG. 10 is a fragmentary perspective view of the tool engagement recess shown in FIG. 9.
Figure 11:
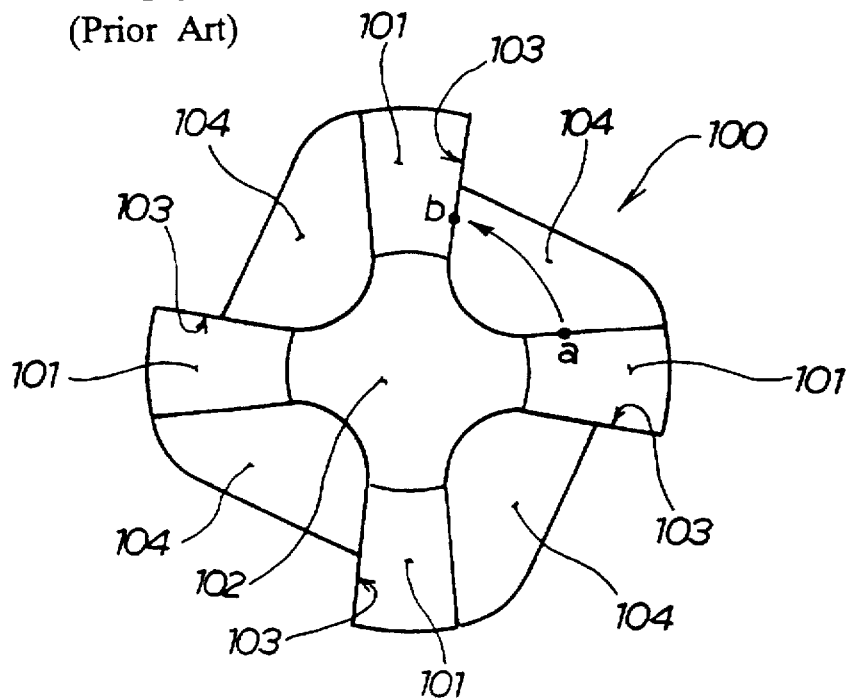
FIG. 11 is a plan view of a tool engagement recess in a conventional loosening preventive, cross-recessed head screw.
Figure 12A:
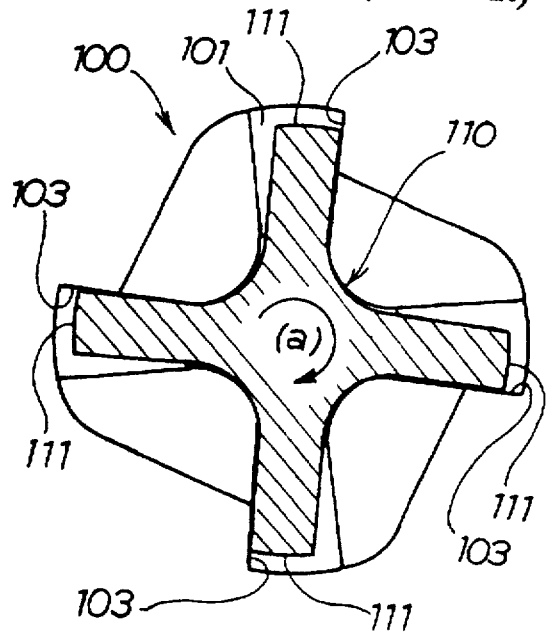
FIGS. 12A and 12B are plan views showing operation of the tool engagement recess of the conventional cross-recessed head screw taken in conjunction with the positional relationship between the tool engagement recess and a screwdriver.
Figure 12B:
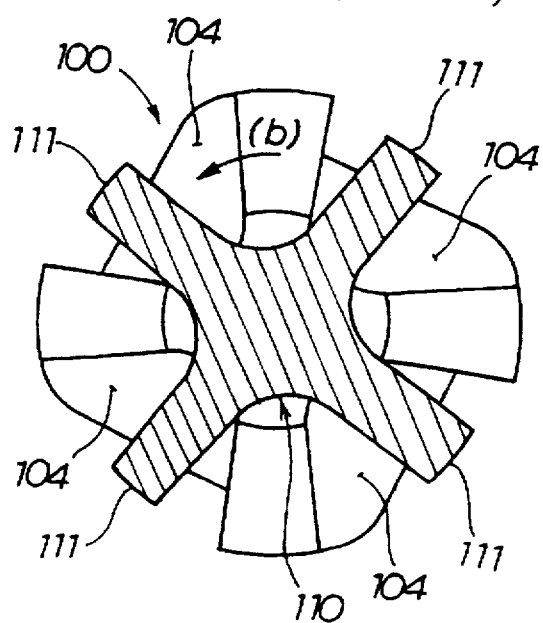

FIGS. 9 and 10 show another embodiment of the tool engagement recess formed in a hexagonal-socket head screw of the present invention.

The tool engagement recess 31 includes a central bottom face 32 located at the center of a head of the hexagonal-socket head screw 10, six discrete or interrupted abutment surfaces 33 extending vertically upwardly from a peripheral edge of the bottom face 32 so as to form a generally hexagonal shape when viewed from above, six releasing surfaces 34 each extending along an upper edge of a corresponding one of the abutment surfaces 33, six arcuate vertical surfaces 35 disposed radially outwardly of the releasing surfaces 34, respectively, and six play portions or gaps 36 each provided between two adjacent ones of the abutment surfaces 33.

Each of the play portions 36, as shown in FIG. 10, is provided in order to form a predetermined gap L between each of the abutment surfaces 33 and a lower end e (starting point of the upward inclination) of the releasing surface 34 associated with the adjacent abutment surface 33 which is located next to the first-mentioned abutment surface 33 in the counterclockwise direction.

By virtue of the play portions or gaps 36, a hexagonal wrench key (allen wrench) can be readily inserted into a desired position or depth in the tool engagement recess 31 once six corners of the wrench key are aligned with the gaps 36, as indicated by the phantom lines in FIG. 9. However, since an excessively large gap 36 results in a releasing surface 34 having an excessively steep upward slope and an insufficient surface area, the gaps 36 should preferably be selected at an appropriate dimension.

The tool engagement recess 2, 11 and 31 of the foregoing embodiments may be formed in a head of screws, machine screws, wood screws, bolts, or the like threaded fastener.

The shape of the socket in the loosening preventive, socket head screw 10 should by no means be limited to the hexagon in the illustrated embodiment but may include a square, an octagon and any other polygonal shape.

As described above, according to a loosening preventive cross-recessed head screw of the present invention, a tool engagement recess formed in the head of the screw has first releasing surfaces which lift bottom edges of the tip end of a screwdriver when the screwdriver is turned in the reverse direction (screw-loosening direction). By virtue of the first releasing surfaces, the driver while being rotated about its axis is gradually retracted toward an open end of the tool engagement recess and finally becomes disengaged from the tool engagement recess. The upward or retracting movement of the screwdriver is guided stably and reliably by second releasing surfaces which are contiguous to the corresponding first releasing surfaces and are slidably engageable with side edges of the tip end of the screwdriver while being rotated in the screw-loosening direction. The screwdriver, as it is lifted by the first releasing surfaces while being rotated in the the screw-loosening direction, produces only a small frictional torque which is quite insufficient to cause the screw to turn in the screw-loosening direction.

Furthermore, since the first releasing surfaces project toward the axis of the central recess, the tip end of a screwdriver comes into abutment with the first releasing surfaces even when the screwdriver thus inserted is a screwdriver one size smaller than the specified screwdriver. Accordingly, rotation of the one-size-smaller screwdriver in the screw-loosening direction does not cause loosening of the screw.

According to a polygonal-socket head screw of the present invention, a tool engagement recess formed in the head of the screw includes a central bottom surface, a plurality of axial abutment surfaces so arranged as to form sides of a polygon when viewed from above, and releasing surfaces formed along outer edges of the respective abutment surfaces for lifting the bottom face of an end of a polygonal wrench key when the wrench key is rotated in the reverse direction (screw-loosening direction). When the wrench key is rotated in the screw-loosening direction, the releasing surfaces guide the bottom face of the wrench key to ascend gradually toward an open end of the tool engagement recess. With this guidance, there is produced only a small friction torque between the wrench key and the tool engagement recess while the wrench key is rotated in the screw-loosening direction. Accordingly, the screw is completely free from a danger of loosening.

What is claimed is:

1. A loosening preventive cross-recessed head screw having a head and in its top a tool engagement recess into which an end of a tool is inserted for turning the screw, said tool engagement recess including:

a central recess located at the center of said head, said central recess having a peripheral wall;

four engagement grooves communicating with said central recess and extending crosswise with respect to said central recess;

an abutment surface forming a part of each of said engagement grooves and extending in the direction of the axis of said screw, said abutment surface being adapted to be forced by the end of the tool when the tool is turned in one direction for tightening said screw;

a first releasing surface forming a contiguous intersection with said peripheral wall of said central recess, said first releasing surface extending away from said central recess and formed between each adjacent pair of said grooves, said first releasing surface being engageable with a front edge of the end of the tool to guide the tool backward when the tool is turned in the opposite direction; and a second releasing surface formed between each adjacent pair of said grooves and contiguous to said first releasing surface and also contiguous to said top of said head, said second releasing surface guiding the backward movement of the tool as the tool while being turned in said opposite direction is guided backward by said first releasing surface.

2. A loosening preventive cross-recessed head screw according to claim 1, wherein said first releasing surface has an upward slope rising in the same direction as rotation of the tool in said opposite direction.

3. A loosening preventive cross-recessed head screw according to claim 1, wherein said first releasing surface is located closer to said central recess than said second releasing surface, said first and second releasing surfaces both having upward inclinations in the direction of rotation of the tool in said opposite direction.

4. A loosening preventive polygonal-socket head screw having in its head a tool engagement recess into which an end of a polygonal wrench key is inserted for turning the screw, said tool engagement recess including:

a bottom surface located at the center of said head;

a plurality of abutment surfaces extending from a peripheral portion of said bottom surface in an axial direction toward an open end of said tool engagement recess and so arranged as to jointly form a polygon when viewed from above, said abutment surfaces being adapted to be forced by the end of the wrench key when the wrench key is turned in one direction;

a plurality of releasing surfaces each extending along an upper edge of a corresponding one of said abutment surfaces and engageable with a front face of the end of the wrench key to move the wrench key backward when the wrench key is turned in the opposite direction; and a plurality of arcuate surfaces extending in said axial direction and each disposed radially outwardly of a corresponding one of said releasing surfaces.

5. A loosening preventive polygon-socket head screw according to claim 4, wherein said releasing surfaces have an upward slope rising in the same direction as rotation of said wrench key in said opposite direction.

6. A loosening preventive polygon-socket head screw according to claim 4, wherein said abutment surfaces are discrete and separated by gaps each disposed between two adjacent ones of said abutment surfaces.

7. A loosening preventive cross-recessed head screw having a head and in its top a tool engagement recess into which an end of a tool is inserted for turning the screw, the end of the tool including four tapered blades arranged crosswise with respect to an axis of rotation of the tool, the tapered blades each having a front edge and a side edge extending contiguously from an outer end of the front edge at an angle with respect to the angle of rotation of the tool which is smaller than that of the front edge, said tool engagement recess including:

a central recess located at the center of said head;

four engagement grooves communicating with said central recess and extending crosswise with respect to said central recess for receiving therein respective ones of the blades of the tool;

an abutment surface forming a part of each of said engagement grooves and extending in the direction of the axis of said screw, said abutment surface being adapted to be forced by each of the blades of the end of the tool when the tool is turned in one direction for tightening said screw;

a sloped first releasing surface extending radically outwardly from said central recess and formed between each adjacent pair of said grooves in the vicinity of a bottom of said central recess, said sloped first releasing surface having a first upward inclination in a direction from the bottom of said central recess toward said top of the head of the screw and a second upward inclination in a direction of rotation of the tool in the opposite direction, said sloped first releasing surface having a bottom contiguous to the bottom of said central recess, said first releasing surface being slidably engageable with the front edge of each blade of the end of the tool to guide the tool backward when the tool is turned in the opposite direction; and a sloped second releasing surface formed between each adjacent pair of said grooves and extending contiguously between an outer peripheral edge of said first releasing surface and said top of said head, said second releasing surface having an upward inclination in a direction from the bottom of said central recess toward said top of the head, said sloped second releasing surface being slidably engageable with the side edge of each blade of the end of the tool to guide the backward movement of the tool as the tool while being turned in said opposite direction is guided backward by said first releasing surface, said first upward inclination of said first releasing surface being smaller in angle than said upward inclination of said second releasing surface.

8. A loosening preventive cross-recessed head screw according to claim 7, wherein said sloped second releasing surface has a second upward inclination in the direction of rotation of the tool in said opposite direction, said sloped first releasing surface having a top located at a level below said top of said head.

* * * * *